(12) United States Patent  
Maeda

(10) Patent No.: US 6,697,252 B2  
(45) Date of Patent: Feb. 24, 2004

(54) DOCKING UNIT FOR PORTABLE COMPUTER

(75) Inventor: Kazuhiko Maeda, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/430,138

(22) Filed: May 6, 2003

(65) Prior Publication Data

US 2003/0202323 A1 Oct. 30, 2003

Related U.S. Application Data

(62) Division of application No. 08/995,722, filed on Dec. 22, 1997, now Pat. No. 6,570,758.

(30) Foreign Application Priority Data

Dec. 24, 1996 (JP) .................................................. 343946

(51) Int. Cl.$^7$ ................................................. G06F 1/16
(52) U.S. Cl. ........................ 361/686; 395/281; 248/552; 70/58; 710/303
(58) Field of Search ................................. 361/686, 683; 248/552, 553; 312/223.1, 223.2; 70/14, 57, 58, 32, 33, 34; 395/281, 282, 283; 710/303, 304

(56) References Cited

U.S. PATENT DOCUMENTS 5,568,359 A * 10/1996 Cavello et al. ............. 361/686  
5,692,400 A * 12/1997 Bliven et al. .................. 70/58  
5,694,292 A * 12/1997 Paulsel et al. ............... 361/686  
5,805,412 A * 9/1998 Yanagisawa et al. ........ 361/686  
6,331,934 B1 * 12/2001 Helot et al. .................. 361/686  
6,424,524 B2 * 7/2002 Bovio et al. ................. 361/686

* cited by examiner

Primary Examiner—Lisa Lea-Edmonds  
(74) Attorney, Agent, or Firm—Douglas W. Cameron; Anne V. Dougherty

(57) ABSTRACT

According to the present invention, provided is a superior docking unit for a portable computer that can provide adequate theft prevention environments for a "single user mode" during which the docking unit is used by only one user, and a "multi-user mode" during which the docking unit is shared by a plurality of users. A docking unit for a portable computer according to the present invention has first and second kensington slots positioned on the outer wall of the main body. When the kensington lock is inserted into the first kensington slot, this event is transmitted to inhibit the release of the engagement of the mounted portable computer, to enable its removal and to restrict the exchange of a PC card relative to the docking unit. But when the kensington lock is inserted into the second kensington slot, this event is not transmitted, so that the mounted portable computer can be removed, and restriction for the exchange of the PC card relative to the docking unit is released. Therefore, in the single user mode, the first kensington lock shall be inserted into the first kensington slot, so that the portable computer and the docking unit can be secured together. In the multi-user mode, the kensington lock shall be inserted into the second kensington slot, so that only the docking unit is secured, the attachment/removal of the portable computer is ensured, and the exchange of the PC card is enabled.

7 Claims, 12 Drawing Sheets

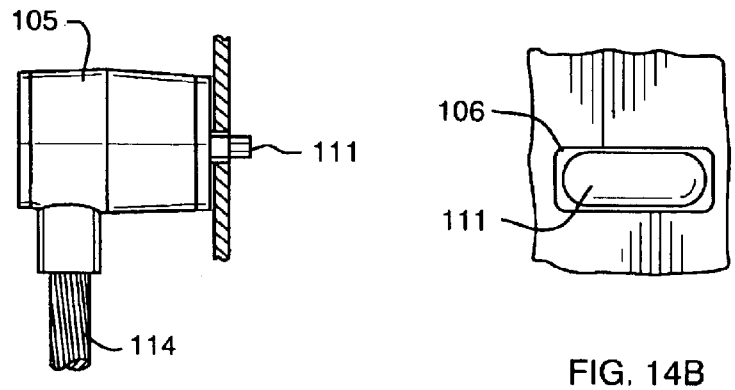
FIG. 14A
FIG. 14B
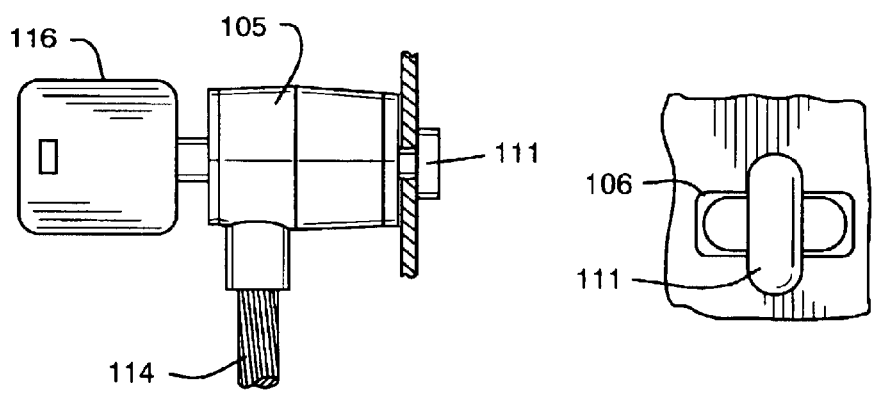
FIG. 15A
FIG. 15B

DOCKING UNIT FOR PORTABLE COMPUTER

This is a division of application Serial No. 08/995,722, filed Dec. 22, 1997 now U.S. Pat. No. 6,570,758.

FIELD OF THE INVENTION

The present invention relates to a docking unit for a portable computer on which is mounted a portable computer to expand its various functions, and in particular, relates to a docking unit for a portable computer that can adequately prevent the main body of the docking unit and a portable computer mounted thereon from being stolen. More specifically, the present invention pertains to a docking unit for a portable computer that provides an adequate security function relative to the environments in which it is used, in a "single user mode," during which the docking unit is employed by only one user, and in a "multi-user mode," during which the docking unit is shared by a plurality of users.

DESCRIPTION OF THE BACKGROUND

As a consequence of recent technical developments, various types of personal computers (PC), such as desktop, tower and notebook types, are being manufactured and sold. Generally, desktop and tower computers are designed to be used on desks or tables in offices and in homes; whereas notebook computers, for which portability is a design consideration, are designed to be operated by batteries in a mobile environment.

Notebook PC and Docking Station

Since it is important that a notebook PC be light and compact, inside one there is no extra space for the installation of expansion adaptor cards and peripheral devices. Further, relying on only a PC card to provide for the expansion of the periphery of a notebook PC is inadequate. And although portability is an important feature of notebook PCs, it is often necessary for a cable (a printer cable, a monitor cable, or a communication cable) to be connected to and disconnected from a notebook computer between office use and mobile use, so that its employment involves some very complicated work and its usability is deteriorated.

A "docking station" (also called an "expansion box" or an "expansion unit") provides for a notebook computer the same work environment as that provided by a desktop or a tower PC when the notebook computer is to be used in an office, while at the same time not deteriorating from the portability of the notebook PC. The main functions of the docking station are two: "port replication" and "bus expansion." A port replication is implemented by providing connection ports for a notebook PC on the docking station. That is, if peripheral devices are connected in advance to the ports on the docking station, a user need only mount his or her notebook PC on the docking station and immediately can use a printer, an external monitor, an external keyboard and a network. When a user desires to transport a notebook PC, he or she need simply remove it from the docking station, leaving all the cables connected to the docking station. Since the port replication function of the docking station collectively manages the cable connections, this function is also called a "cable management function." The bus expansion function is implemented by the docking station expanding an input/output bus (or the local bus) of the notebook PC or by providing a bus slot on the docking station. In other words, while an expansion adaptor card or peripheral devices can not be attached to the notebook PC, these devices can be used through the docking station. A docking station that provides only port replication may be called a "port replicator".

In FIG. 11 is shown a typically styled notebook PC 100 and a docking station 200. The notebook PC 100 has a docking connector (not shown) on its rear face. The docking connector normally includes several tens to several hundreds of connector pins. Each connector pin is allocated for a port signal or a bus signal transmitted by the notebook PC 100.

The docking station 200 comprises a relatively thick main body in which electric circuits are incorporated, with thin mounting portion by which the notebook PC 100 is mounted at the front of the main body. A connector, 101, for joining the docking connector (previously described) to the rear face of the notebook PC 100 is provided at the front of the main body. A cover that can be opened and closed may be provided on the surface of the docking connector to protect it from a mechanical impact when the docking station is not used. A pair of linear protrusions, 102 and 103, along which the notebook PC 100 is guided in the attachment direction, may be formed on either side edge of the mounting portion.

The functions and the structure of a docking station are already disclosed in Japanese Patent Applications No. Hei 05-181593 (U.S. Ser. No. 08/276,231, filed Jul. 18, 1994 and now abandoned) and No. Hei 06-134124 (U.S. Ser. No. 08/416,398 filed Apr. 6, 1995), both of which were assigned to the present assignee.

The employment styles for the docking station can be classified as a "single user mode" and a "multi-user mode." In the single user mode, only one PC user employs the docking station. In other words, only one specific notebook PC is mounted on a docking station. In the multi-user mode, a plurality of PC users employ the docking station in common. In the multi-user mode, therefore, the notebook PCs of a number of individual users may alternately be mounted on one docking station.

Security of Notebook PC

While various electronic apparatuses are made compact and light and thus are easy to carry, an unwanted side effect of this is that thefts of the apparatuses have increased. Notebook PCs especially tend to be stolen because their processing capability has been improved and also because notebook PCs have become popular. Peripheral devices that are detachably connected to a PC may also be stolen. For example, since a PC card is a cartridge type and is only as small as a business card, it can easily be stolen. A removable hard disk drive, HDD, may also be stolen because of the data it holds. Therefore, today, the emphasis is on improving office security, i.e., instituting countermeasures to prevent the theft of electronic apparatuses.

The theft of a notebook PC can be easily prevented by employing a so-called "kensington lock." The kensington lock, 105 and 107, is used to inhibit the removal of a notebook PC from a predetermined location by one end of the lock's main body being fixed to an external wall of the case of the notebook PC (e.g., in FIG. 12, the side of the case shown in (a) or the rear face in (b)), and by securing the cable that extends from the lock's main body at a specific location in an office (e.g., the leg of a desk). The kensington lock is an optional component that is sold separately from the notebook PC. A kensington lock sold by Kensington Microware Limited can be employed.

FIG. 13 is a schematic diagram illustrating the assembly of the kensington lock. The kensington lock is constituted by a housing wherein a spindle is rotatably provided.

The spindle has a first portion retained in the housing, and a T-shaped shaft that is fixed to the first portion and projects outward from the housing. The length of the leg of the T-shaped shaft, which projects outward from the housing, almost equals the thickness of the external wall of the case of the notebook PC (see FIGS. 14(a) and 15(a)). The outer size of the head of the T-shaped shaft almost equals the inner dimensions of a kensington slot formed in the external wall of the notebook PC (see FIGS. 13(c) and (d), and FIG. 14(b)). A pair of raised contact members are formed at the end of the housing to sandwich the leg of the shaft. The size in cross section of an assembly of the pair of contact members and the leg of the T-shaped shaft almost equals the inner dimensions of the kensington slot formed in the external wall of the notebook PC (see FIGS. 13(c) and (e)). The kensington lock can be inserted into the kensington slot at the shaft rotation position where the head of the T-shaped shaft overlaps the contact members.

A key hole (not shown in FIG. 13) is formed in the other end (the reverse face of the housing) of the spindle. A key that has engaged the key hole can be rotated, together with the spindle, i.e, the T-shaped shaft, through an angle of 90°. Therefore, by superimposing the head of the T-shaped shaft on the outline of the contact members, this assembly can be inserted into the kensington slot (see FIGS. 14(a) and 14(b)). After the kensington lock is inserted into the kensington slot, the key, 116, fitted in the key hole is rotated 90° to inhibit removal of the kensington lock from the kensington slot (see FIGS. 15(a) and 15(b)). In this condition, the key is extracted from the key hole, so that the spindle, i.e., the T-shaped shaft can not be rotated, and the kensington lock is secured to the external wall of the PC. A tab accepting one end of a cable, 114, is provided on the side of the housing. The other end of the cable (not shown) is secured at a specified location in an office (e.g., to the leg of a desk), so that the PC to which the kensington lock is attached can not be carried away.

The details of the kensington lock are also disclosed in U.S. Pat. No. 5,381,685 (Japanese Unexamined Patent Publication No. Hei 06-511297).

Security of Docking Station

There are two primary purposes of providing security for the docking station. The first purpose is the security of the docking station itself, and the second purpose is the security of a notebook PC mounted on the docking station. For the first purpose, security can be easily implemented by securing the kensington lock to the main body of the docking station, as well as to the main body of the notebook PC.

For the second purpose, security is not so easily achieved because the docking station has two different use styles, the single user mode and the multi-user mode, and the applicable security policy differs for each mode. In the single user mode, the security for both the docking station and the mounted notebook PC is required, and both apparatuses should be secured at a predetermined location in the office. In the multi-user mode, although the docking station has to be secured at a predetermined location in the office, a notebook PC should not be secured to the docking station, else shared use of the docking station by other uses would not be possible.

A port replicator (Product Model ID No. 46H4219), which is designed and produced by IBM Corp. for the notebook computer "IBM ThinkPad560 ("ThinkPad" is a trademark of IBM Corp.) sold by IBM Japan, Ltd., interacts with the insertion of the kensington lock into the kensington slot and restricts the operation of the ejection mechanism for the notebook PC. In short, the notebook PC and the port replicator are integrally locked. The security mechanism is specifically designed for use in a single user mode.

Docking station "Dock,/SelectaDock," which is designed and produced by IBM Corp. for the notebook PC "IBM ThinkPad760" sold by IBM Japan, Ltd., includes a kensington slot for securing the docking station, and a PC locking mechanism for securing a notebook PC to the docking station. The kensington lock and the PC locking mechanism can be operated by individual keys, and the locking mechanism does not interact with the attachment of the kensington lock. In this case, since a user can separately select the use for the kensington lock and the locking of the notebook PC, a difference between the security policies for the single user mode and the multi-user mode can be absorbed. However, a user must be accountable for two different keys and bear more responsibility for security.

In Japanese Unexamined Patent Publications No. Hei 06-124141 and No. Hei 07-104884, prevention of the theft of an expansion unit is the stated purpose and a technique for locking a notebook PC to the expansion unit is disclosed. These publications merely provide for the notebook PC to be secured to the expansion unit for stable employment, and do not take into consideration the use of the expansion unit when switching between the single user mode and the multi-user mode is performed.

Recently, as was previously described, a notebook PC and a docking station have a PC card slot for inserting a PC card. Since plug-and-play is the standard specification for the PC card, a cartridge form factor is used with which attachment and removal is easy, and accordingly, PC card theft is easy. The prevention of PC card theft from a notebook PC is recited in, for example, Japanese Patent Application No. Hei 05-182972 (Japanese Unexamined Patent Publication No. Hei 07-44269: our docket No. JA9-93-030), which was assigned to the present inventor. According to this specification, a curved engagement piece is attached near a PC card exchange opening in the PC main body to prevent the removal of a PC card.

Since, basically, a PC card inserted into a notebook PC is owned by a user of a notebook PC, no problem will arise even if a PC card security mechanism interacts with the security mechanism for the main body of the notebook PC. This is rather convenient for the user. In actuality, however, when a PC card is inserted in the docking station, no determination is made as to whether it is owned by a single user or by multiple users, and the security policy varies in each case. Therefore, the security for a PC card is accompanied by the same problems as is the security for the docking station. If the PC card security mechanism is specifically designed for either a single user mode or a multi-user mode, the security of one of them can not be ensured. In addition, if a special locking mechanism is provided for each mode, the operation will become complex.

Docking station "Dock,/SelectaDock" (previously described), which is produced by IBM Corp. for the notebook PC "IBM ThinkPad760" sold by IBM Japan Ltd., has PC card slots, and permits the separate locking of PC card slots in the notebook PC and in the docking station, so that the difference between the security policies for the single user mode and the multi-user mode can be absorbed. As is described above, however, it is required that two security mechanisms be used, so that a user must be accountable for two different keys.

The prevention of the theft of a PC card from an expansion unit is not cited in previously described Japanese Unexamined Patent Publications No. Hei 06-124141 and No. Hei 07-104884.

It is, therefore, one object of the present invention to provide a superior docking unit for a portable computer that can effectively prevent the theft of the main body of the docking unit and a portable computer mounted thereon.

It is another object of the present invention to provide a superior docking unit for a portable computer that can provide adequate theft prevention environments for both a "single user mode", during which the docking unit is used by only one user, and a "multi-user mode", during which the docking unit is shared by a plurality of users.

It is an additional object of the present invention to provide a superior docking unit for a portable computer that can adequately prevent the theft of a portable computer mounted on the docking unit, which is either in a "single user mode" during which the docking unit is used by only one user or a "multi-user mode" during which the docking unit is shared by a plurality of users.

It is a further object of the present invention to provide a superior docking unit for a portable computer that permits the exchange of a portable computer mounted thereon, while ensuring the security of the docking unit and a PC card.

It is still another object of the present invention to provide a superior docking unit for a portable computer that can adequately prevent the theft of a PC card in both a "single user mode" during which the docking unit is used by only one user, and a "multi-user mode" during which the docking unit is shared by a plurality of users.

SUMMARY OF THE PRESENT INVENTION

To achieve the above objects, according to a first aspect of the present invention, a docking unit for mounting a portable computer comprises: (a) a main body; (b) a mounting portion for mounting a portable computer; (c) a first locking portion provided on the outer wall of the main body; (d) a second locking portion provided on the outer wall of the main body; (e) engaging means for engaging with the portable computer mounted on the mounting portion; and (f) engaging control means for controlling the engaging means from being released in response to a condition where a locking member, for securing the docking unit to a desired surrounding object, is loaded either at the first locking portion or at the second locking portion.

According to a second aspect of the present invention, a docking unit for mounting a portable computer comprises: (a) a main body; (b) a mounting portion for mounting a portable computer; (c) a first kensington slot provided on the outer wall of the main body; (d) a second kensington slot provided on the outer wall of the main body; (e) engaging means for engaging with the portable computer mounted on the mounting portion; and (f) engaging control means for controlling the engaging means from being released in response to whether a kensington lock is inserted into the first kensington slot or the second kensington slot.

According to a third aspect of the present invention, a docking unit for mounting a portable computer comprises: (a) a main body; (b) a mounting portion for mounting a portable computer; (c) a first kensington slot provided on the outer wall of the main body; (d) a second kensington slot provided on the outer wall of the main body; (e) engaging means for engaging with the portable computer mounted on the mounting portion; and (f) engaging control means for inhibiting the engaging means from being released when a kensington lock is inserted into the first kensington slot, and for not inhibiting the engaging means from being released when the kensington lock is inserted into the second kensington slot.

According to a fourth aspect of the present invention, a docking unit for mounting a portable computer comprises: (a) a main body; (b) a mounting portion for mounting a portable computer; (c) a PC card slot provided in the main body for inserting a PC card; (d) ejecting means provided for the PC card slot for ejecting an inserted PC card; (e) a first kensington slot provided on the outer wall of the main body; (f) a second kensington slot provided on the outer wall of the main body; (g) engaging means for engaging with the portable computer mounted on the mounting portion; and (h) engaging control means for inhibiting both activation of the ejecting means and release of the engaging means when a kensington lock is inserted into the first kensington slot, and for inhibiting activation of the ejecting means but not inhibiting release of the engaging means when the kensington lock is inserted into the second kensington slot.

According to a fifth aspect of the present invention, a docking unit for mounting a portable computer comprises: (a) a main body; (b) a mounting portion for mounting a portable computer; (c) a first kensington slot provided on the outer wall of the main body; (d) a second kensington slot provided on the outer wall of the main body; (e) engaging means for engaging with the portable computer mounted on the mounting portion; (f) engaging release means for releasing the portable computer from an engaging with the engaging means; and (g) notification means for inhibiting release of an engaging by notifying the engaging release means that a kensington lock has been inserted into the first kensington slot, and for not notifying the engaging release means that the kensington lock has been inserted into the second kensington slot.

According to a sixth aspect of the present invention, a docking unit for mounting a portable computer comprises: (a) a main body; (b) a mounting portion for mounting a portable computer; (c) a PC card slot provided in the main body for inserting a PC card; (d) restricting means formed at the ejection opening of the PC card slot to restrict the exchange of a PC card; (e) a first locking portion provided on the outer wall of the main body; (f) a second locking portion provided on the outer wall of the main body; (g) restricting release means for releasing a restriction of the exchange of a PC card imposed by the restricting means; and (h) means for maintaining a restriction condition of the exchange of a PC card in response to whether a locking member, for securing the docking unit to a desired peripheral object, is attached to the first locking portion or the second locking portion.

According to a seventh aspect of the present invention, a docking unit for mounting a portable computer comprises: (a) a main body; (b) a mounting portion for mounting a portable computer; (c) a PC card slot provided in the main body for inserting a PC card; (d) restricting means formed at the ejection opening of the PC card slot to restrict the exchange of a PC card; (e) a first kensington slot provided on the outer wall of the main body; (f) a second kensington slot provided on the outer wall of the main body; (g) restricting release means for releasing a restriction of the exchange of a PC card imposed by the restricting means; and (h) notification means for notifying the restricting release means whether a kensington lock has been inserted into the first or the second kensington slot, in order to maintain the restriction condition of the exchange of a PC card.

According to an eighth aspect of the present invention, a docking unit for mounting a portable computer comprises: (a) a main body; (b) a mounting portion for mounting a portable computer; (c) a PC card slot provided in the main body for inserting a PC card; (d) restricting means formed at the ejection opening of the PC card slot to restrict the exchange of a PC card; (e) a first kensington slot provided on the outer wall of the main body, (f) a second kensington slot provided on the outer wall of the main body; (g) engaging means for engaging with the portable computer mounted on the mounting portion; (h) engaging release means for releasing the portable computer from an engaging with the engaging means; (i) restricting release means for releasing a restriction of the exchange of a PC card imposed by the restricting means; (j) first notification means for inhibiting release of an engagement by notifying the engaging release means that a kensington lock has been inserted into the first kensington slot, and for not notifying the engaging release means that the kensington lock has been inserted into the second kensington slot; and (k) second notification means for maintaining restriction of the exchange of a PC card by notifying the restricting release means that the kensington lock has been inserted into either the first or the second kensington slot.

According to a ninth aspect of the present invention, a docking unit for mounting a portable computer comprises: (a) a main body; (b) a mounting portion for mounting a portable computer; (c) a PC card slot provided in the main body for inserting a PC card; (d) ejecting means provided for the PC card slot for ejecting an inserted PC card; (e) a first kensington slot provided on the outer wall of the main body; (f) a second kensington slot provided on the outer wall of the main body; (g) engaging means for engaging with the portable computer mounted on the mounting portion; and (h) engaging control means for inhibiting both an ejection of the ejecting means and release of the engaging means when a kensington lock is inserted into the first kensington slot, and for not inhibiting neither an ejection of the ejecting means nor release of the engaging means even though the kensington lock is inserted into the second kensington slot.

According to a tenth aspect of the present invention, a docking unit for mounting a portable computer comprises: (a) a main body; (b) a mounting portion for mounting a portable computer; (c) a PC card slot provided in the main body for inserting a PC card; (d) restricting means formed at the ejection opening of the PC card slot to restrict the exchange of a PC card; (e) a first kensington slot provided on the outer wall of the main body; (f) a second kensington slot provided on the outer wall of the main body; (g) restricting release means for releasing a restriction of the exchange of a PC card imposed by the restricting means; and (h) notification means for inhibiting release of a restriction by notifying the restricting release means that a kensington lock has been inserted into the first kensington slot, and for not notifying the restricting release means that the kensington lock has been inserted into the second kensington slot.

According to an eleventh aspect of the present invention, a docking unit for mounting a portable computer comprises: (a) a main body; (b) a mounting portion for mounting a portable computer; (c) a PC card slot provided in the main body for inserting a PC card; (d) restricting means formed at the ejection opening of the PC card slot to restrict the exchange of a PC card; (e) a first kensington slot provided on the outer wall of the main body; (f) a second kensington slot provided on the outer wall of the main body; (g) engaging means for engaging with the portable computer mounted on the mounting portion; (h) engaging release means for releasing the portable computer from engaging with the engaging means; (i) restricting release means for releasing a restriction of the exchange of a PC card imposed by the restricting means; (j) first notification means for inhibiting release of an engagement by notifying the engaging release means that a kensington lock has been inserted into the first kensington slot, and for not notifying the engaging release means that the kensington lock has been inserted into the second kensington slot; and (k) second notification means for inhibiting release of an engagement by notifying the engaging release means that a kensington lock has been inserted into the first kensington slot, and for not notifying the engaging release means that the kensington lock has been inserted into the second kensington slot.

According to a twelfth aspect of the present invention, a portable electronic apparatus comprises: (a) a main body; (b) a first locking portion provided on the outer wall of the main body; (c) a second locking portion provided on the outer wall of the main body; (d) first theft prevention means for setting the main body to a first security mode when a locking member, for locking the main body to a desired peripheral object, is inserted into the first locking portion; and (e) second theft prevention means for setting the main body to a second security mode which differs from the first security mode, when the locking member is inserted into the second locking portion.

According to a thirteenth aspect of the present invention, a portable electronic apparatus comprises: (a) a main body; (b) a first kensington slot provided on the outer wall of the main body; (c) a second kensington slot provided on the outer wall of the main body; (d) first theft prevention means for setting the main body to a first security mode when a kensington lock is inserted into the first kensington slot; and (e) second theft prevention means for setting the main body to a second security mode being different from the first security mode, when the kensington lock is inserted into the second kensington slot.

According to a fourteenth aspect of the present invention, a docking unit for mounting a portable computer comprises: (a) a main body; (b) a mounting portion, for mounting a portable computer thereon; (c) a docking connector provided at an elevated location on the mounting portion for an electrical connection with the portable computer on the mounting portion; (d) engaging means for engaging with the portable computer mounted on the mounting portion; (e) ejecting means, provided on the mounting portion, that can be vertically projected and retracted, and that is vertically projected and raises the portable computer mounted on the mounting portion, so that the portable computer can be removed from the docking connector; (f) ejecting instruction means used by a user to instruct ejection of the mounted portable computer; (g) notification means for, in response to a user's operation of the ejecting instruction means, releasing the engaging means and extending the ejecting means upward; and (h) retracting prevention means for, even after the user has operated the ejecting instruction means, preventing the ejecting means when elevated from descending and being retracted into the mounting portion.

In a docking unit for a portable computer according to the fourteenth aspect of the present invention, for preventing retraction, sufficient driving force shall be provided for the restricting prevention means to counter the portable computer's weight. A docking unit for a portable computer according to the present invention has the first and the second kensington slots positioned on the outer wall of the main body.

When the kensington lock is inserted into the first kensington slot, this event is transmitted to inhibit the release of the engaging of the mounted portable computer, and to unenable its removal. But when the kensington lock is inserted into the second kensington slot, this event is not transmitted, so that the mounted portable computer can be removed. Therefore, in the single user mode, when the kensington lock is inserted into the first kensington slot, the portable computer and the docking unit can be secured together. In the multi-user mode, when the kensington lock is inserted into the second kensington slot, only the docking unit is secured, and the attachment and removal of the portable computer is ensured. In other words, the docking unit for a portable computer of the present invention can absorb the differences in the security policies for the single user mode and the multi-user mode.

In the docking unit according to the fourth, seventh and eighth aspects, when the kensington lock is inserted into either the first or the second kensington slots, this event is transmitted to restrict the exchange of a PC card relative to the docking unit. Not only the main body of the docking unit and the mounted notebook PC, but also the PC card are locked, so that the theft of PC cards can be prevented.

In the docking unit according to the ninth, tenth and eleventh aspects, when the kensington lock is inserted into the first kensington slot, this event is transmitted to restrict the exchange of a PC card relative to the docking unit. When the kensington lock is inserted into the second kensington slot, this event is not transmitted, and the restriction concerning the exchange of the PC card relative to the docking unit is freely released. Therefore, in the single user mode, the exchange of the PC card relative to the docking unit is inhibited by inserting the kensington lock into the first kensington slot, and theft of both the PC card and the docking unit can be prevented. But in the multi-user mode, the exchange of a PC card relative to the docking unit is ensured by the insertion of the kensington lock into the second kensington slot, and PC cards can be exchanged by the individual users.

That is, according to the docking unit of the present invention, environments that provide adequate safeguards for the prevention of theft are provided for the "single user mode", in which the docking unit is used by only one user, and the "multi-user mode", in which the docking unit is shared by a plurality of users. Further, the docking unit of the present invention can handle the respective security policies for PC cards that differ for the single user mode and for the multi-user mode.

With the docking unit for a portable computer of the present invention, the theft of PC cards can be effectively prevented in the environment for the "single user mode", in which the docking unit is employed by only a single user and in that for the "multi-user mode", in which the docking unit is employed by a plurality of users.

In the docking unit according to the fourteenth aspect, there is little chance that the notebook PC that is ejected upward will be dropped and that the connectors will come into contact. Thus, the chattering that accompanies the contact of the connectors and the damage to data that is due to the chattering can be prevented.

BRIEF DESCRIPTION OF THE DRAWINGS

The other objects, features, and advantages of the present invention will become apparent in due course during the detailed description of the embodiment of the present invention, which will be given while referring to the accompanying drawings.

FIG. 14 is a diagram illustrating the condition where the kensington lock is inserted into the outer wall of the PC, and more specifically with FIG. 14(a) being a side view and FIG. 14(b) being a diagram for the kensington slot viewed from the inside of the PC.

FIG. 15 is a diagram illustrating the condition where the kensington lock is fixed to the outer wall of the PC, and more specifically, FIG. 15(a) being a side view and FIG. 15(b) being a diagram for the kensington slot viewed from the inside of the PC.

DESCRIPTION OF THE PREFERRED EMBODIMENTS

First Embodiment

Figure 1:
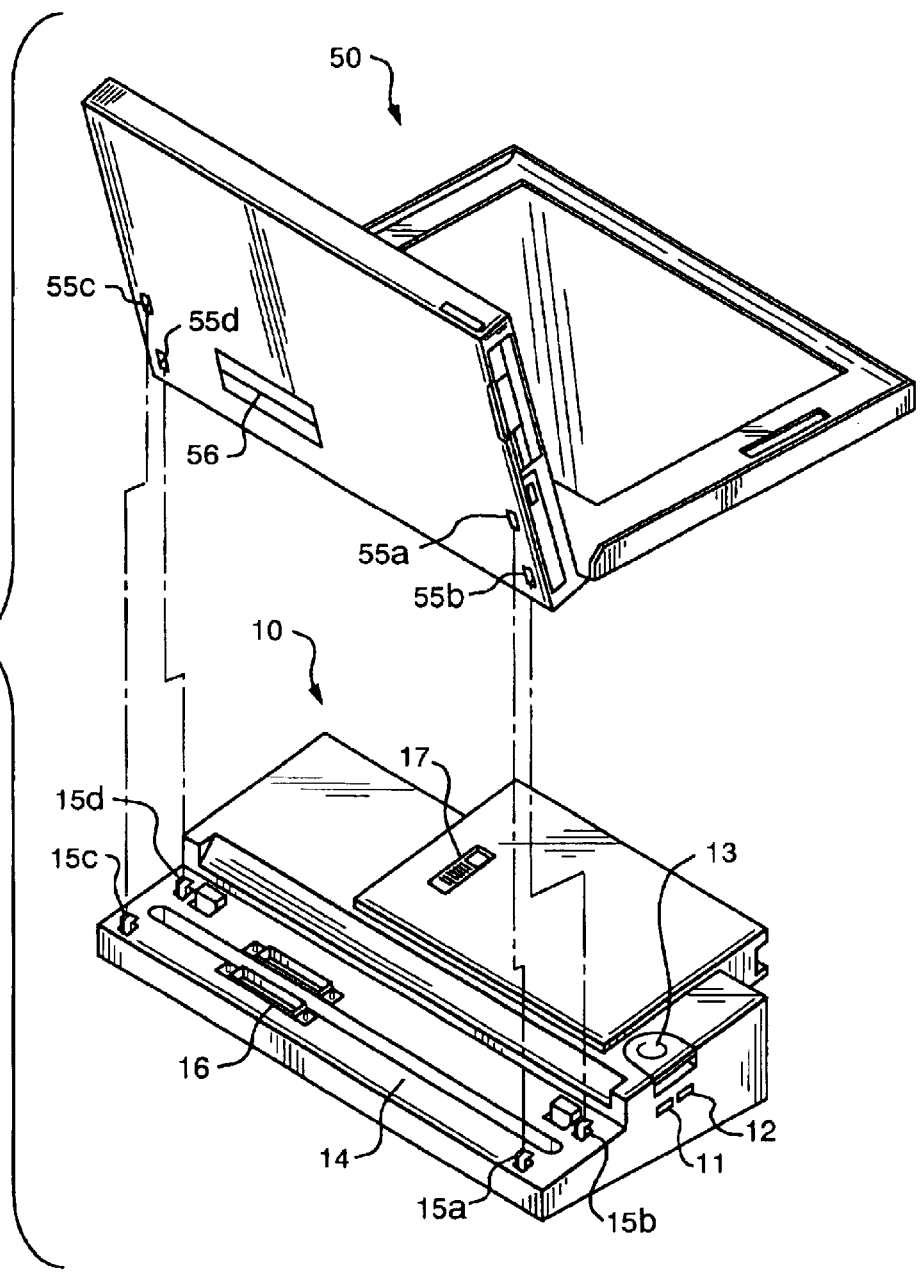
FIG. 1 is a diagram illustrating outlines of a docking station 10 and a notebook PC 50.

FIG. 1 is a diagram illustrating the outline of a docking station 10 and a notebook PC 50 according to the present invention. The docking station 10 has a relatively thick main body and a thin mounting portion 14 provided at the front of the main body.

A pair of kensington slots 11 and 12 are formed in a right side wall of the main body of the docking station 10. The kensington slots 11 and 12, which are the same size, can accept a T-shaped shaft of a kensington lock (previously described and not shown in FIG. 1). The prevention of the theft of the docking station 10 can be ensured by inserting a kensington lock into at least one of the kensington slots 11 and 12.

An eject button 13 and a slide knob 17 are provided on the top face of the main body. The eject button 13 is used to disengage the mounted notebook PC 50 from the docking station 10 when the notebook PC 50 is to be removed. When the eject button 13 is pressed, this action is transmitted to front hooks 15a, 15b, 15c and 15d, which will be described later. The slide knob 17 is so provided that it slides forward and backward along an opening formed in the top face of the main body. The movement of the slide knob 17 is transmitted to a mechanism for inhibiting the exchange of a PC card, which will be described later.

The mounting portion 14 is a table on which the notebook PC 50 is mounted. The hooks 15a, 15b, 15c and 15d are provided at the four corners of the mounting portion 14. The hooks 15 have an L-shaped head, a corner of which is chamfered, and can move 5 mm forward and backward. To mount the notebook PC 50, first, the heads of the-hooks 15a, 15b, 15c and 15d are inserted into engagement holes 55a, 55b, 55c and 55d, which are formed in the bottom of the notebook PC 50. Then, the L-shaped heads of the hooks 15 engage the bottom of the notebook PC 50, so that the units 10 and 50 are joined together. To remove the notebook PC 50 from the docking unit 10, the eject button 13 is pressed to release the hooks 15 and more than 5 mm forward, so that they are disengaged from the notebook PC 50, which will be described later. The number of hooks 15 is a design matter determined in accordance with the strength required to secure the notebook PC 50. Even if only one hook is provided on each side, instead of two hooks as in the embodiment, this has no affect on the subject of the present invention.

A docking connector 16 is provided facing upward for electric connection with the notebook PC 50. A docking connector 56, whose specifications match those of the connector 16, is provided facing downward at a corresponding location in the bottom of the notebook PC 50. When the notebook PC 50 is mounted on the mounting portion 14, the docking connectors 16 and 56 are coupled together to permit the exchange of electric signals between the units 10 and 50. Although, in this embodiment, the docking connecters 16 and 56 are constituted by two connector rows, this is a design matter determined in accordance with the number of pins that are provided for the connectors 16 and 56. The size and the structure of the connectors 16 and 56 do not directly affect the subject of the present invention.

The top face of the mounting portion 14 is moderately inclined to the front, so that the keyboard unit of the mounted notebook PC 50 is tilted to facilitate typing.

The notebook PC 50 in FIG. 1 has a so-called "clam shell" structure constituted by a main body which includes a keyboard unit (not shown), and a lid which includes a liquid crystal display (not shown). Inside the case of the notebook PC 50 are provided a system board on which are mounted various electronic components, such as a CPU, a memory and a video controller chip; and peripheral devices, such as a hard disk drive (HDD) and a floppy disk drive (FDD). The structures and operations of these electric/electronic components are not directly related to the subject of the present invention, so that no further explanation for them will be given in this specification.

Figure 2:
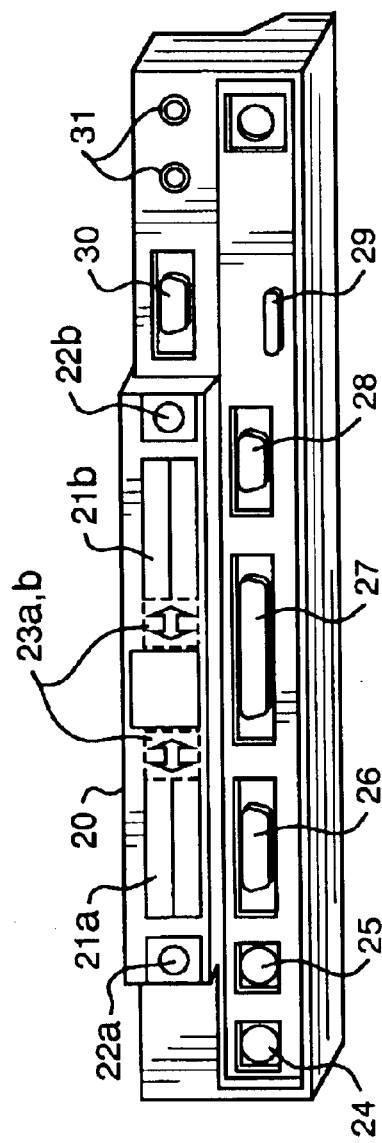
FIG. 2 is a perspective view of the rear face of the docking station 10.

FIG. 2 is a diagram illustrating the rear face of the docking station 10. A portion 20 that is raised to the rear is formed on the rear face.

A pair of PC card slots 21a and 21b are mounted in the raised portion 20. Type- cards that conform to the standard developed by PCMCIA (Personal Computer Memory Card International Association)/JEIDA (Japan Electronic Industry Development Association) can be inserted into both of the slots 21a or 21b. A pair of eject buttons 22a and 22b are provided at either end of the raised portion 20 to eject inserted PC cards (not shown). The PC card ejecting mechanism is not directly related to the subject of the present invention, so that no further explanation for it will be given.

A pair of horizontally retractable card shutters 23a and 23b (indicated by the broken lines in FIG. 2) are attached in almost the center of the raised portion 20. The movement of the card shutters 23a and 23b interacts with the sliding of the slide knob 17 (previously described). In other words, when the slide knob 17 is moved to the front of the docking station 10, this movement is transmitted by an internal mechanism (which will be described later) to the card shutters 23a and 23b, and they are moved to the right and to the left respectively. Since when the card shutters 23a and 23b appear they cover at least part of the exchange opening of each of the card slots 21a and 21b, the exchange of PC cards can be inhibited. As a result, the theft, such as the stealing of an inserted PC card, or the insertion of a PC card by an unauthorized user who wants to access internal data in the units 10 and 50 via the PC card, can be prevented. Although the docking station 10 in this embodiment has two PC card slots, the number of card slots provided is merely a design matter.

On the other portions of the rear face of the docking station 10 are provided an external mouse port 24, an external keyboard port 25, a MIDI (Musical Instrument Digital Interface)/joystick port, a parallel port 27, a serial port 28, an external FDD port 29, an external CRT (Cathode Ray Tube) port 30, and a line input/output port 31. For example, a modem can be connected to the serial port 28, and a printer can be connected to the parallel port 27. Port signals assigned to the connector pins of the docking connector 16 are transmitted within the docking station 10 and relayed to the corresponding ports. The types of ports and the number of ports provided for the docking station 10 are design matters and are not directly related to the subject of the present invention.

The internal structure of the docking station 10 and the operational characteristics of its movable portion will now be described in detail.

Figure 3:
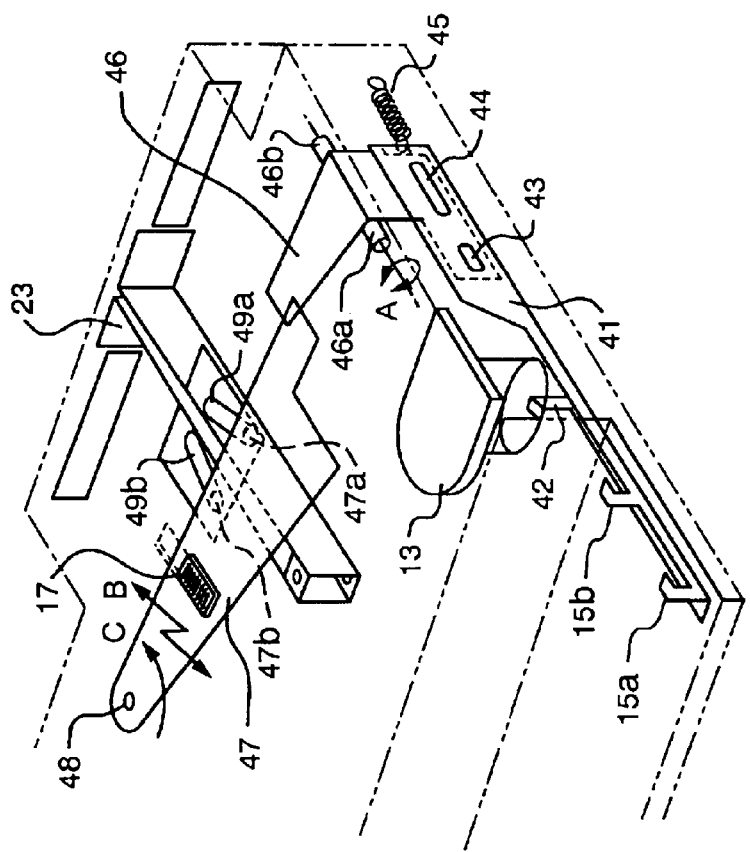
FIG. 3 is a diagram illustrating the internal structure of the docking station 10, with the edges of a case being represented by broken lines.

In FIG. 3 is shown the internal structure of the case of the docking station 10, which is described by chain double-dashed lines. To avoid complexity in the drawing, components that are not related to the security mechanism are not shown. Peripheral members for supporting movable portions, or for defining the directions of their movements, are in actuality provided, but are not shown in order to simplify the drawing.

A slider 41 has an elongated leg extending to the front, with two hooks 15a and 15b integrally formed at and near the end of the leg, and the protrusion 42 integrally formed at its center. The hooks 15a and 15b extend outward through openings formed in the upper face of the mounting portion 14. A first linear hole 43 and a second linear hole 44 are formed at the rear in the slider 41. The linear holes 43 and 44 are located at positions that correspond to those of the kensington slots 11 and 12, which are formed on the right side wall of the docking station 10. Since the widths of the linear holes 43 and 44 are the same as the width of the head of the T-shaped shaft of a kensington slot, the head of the T-shaped shaft inserted in either slot 11 or 12 can pass through either the hole 43 or 44. It should be noted that the length of the first linear hole 43 is the same as the head of the T-shaped shaft, while the second linear hole 44 is longer than the head of the T-shaped shaft.

The slider 41 is so supported by a member (not shown) that it can slide forward and backward. When no kensington lock is inserted into either kensington slot 11 or 12, the slider 41 can move forward. When a kensington lock is inserted into the kensington slot 12, the corresponding linear hole 44 has a larger clearance in the forward and backward direction, and the forward movement of the slider 41 is thus permitted. When a kensington lock is inserted into the kensington slot 11, the corresponding linear hole 43 has almost no clearance in the forward and backward direction, and the forward movement of the slider 41 is thus inhibited.

One end of a coil spring 45 is fixed to the rear portion of the slider 41, and the other end is fixed to the rear wall (not shown) of the docking station 10. The slider 41 is constantly retracted by the recovery force exerted by the coil spring 45.

Figure 4:
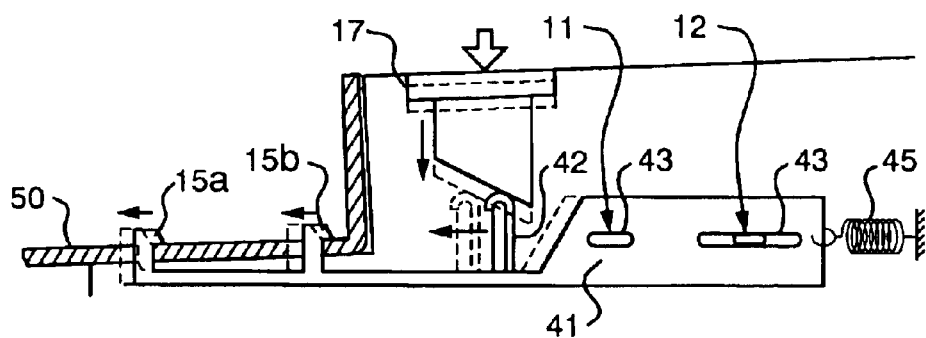
FIG. 4 is a cross-sectional view of the docking station 10 showing the movement of a slider 41 correlated with the attachment and removal of the notebook PC 50.

FIG. 4 is a cross-sectional view of the docking station 10. The condition where the slider 41 slides is shown correlated with the attachment and the removal of the notebook PC 50.

The attachment of the notebook PC 50 will now be explained. The hooks 15a and 15b have L-shaped heads, one corner of which is chamfered. The engagement holes 55a and 55b, which are formed in the bottom of the notebook PC 50, have the same internal size as the external size of the heads of the hooks 15a and 15b, and their front edges are located 5 mm forward of the hooks 15a and 15b. To mount the notebook PC 50, therefore, first, the heads of the hooks 15a and 15b contact the rear edges of the engagement holes 55a and 55b. As the bottom face of the notebook PC 50 descends, the rear edges of the engagement holes 55a and 55b slide along the chamfered portions of the heads of the hooks 15a and 15b, and the hooks 15a and 15b are driven forward. Accordingly, the slider 41, which is integrally formed with the hooks 15a and 15b, is also moved forward against the recovery force exerted by the coil spring 45 (see the broken line in FIG. 4). When the heads of the hooks 15a and 15b are fully inserted through the bottom of the notebook PC 50, the hooks 15a and 15b and the slider 41, for which obstacles to their rearward movement no longer exist, are returned to their initial positions. When the L-shaped heads of the hooks 15a and 15b contact the rear edges of the engagement holes 55a and 55b, the units 10 and 50 are fully engaged.

The removal of the notebook PC 50 will now be explained. The bottom of the eject button 13, which is cut off diagonally, contacts the distal end of the linear protrusion 42, which is integrally formed with the slider 41. Thus, when the eject button 13 is pressed down, the linear protrusion 42 is forced forward and slides along the inclined surface of the bottom of the eject button 13 (see the broken line in FIG. 4). As a result, the slider 41 and the hooks 15a and 15b, which are integrally formed with the linear protrusion 42, are driven forward against the recovery force exerted by the coil spring 45. Then, the point is reached where the bottom wall of the notebook PC 50, which is engaged by the hooks 15a and 15b that pass through the engagement holes 55a and 55b, is released, so that the notebook PC 50 can be removed.

When no kensington lock is inserted into either kensington slot 11 or 12, the forward movement of the slider 41 is not restricted, and the mounted notebook PC 50 can be freely removed. Even when a kensington lock is inserted into the kensington slot 12, the slider 41 can move forward, permitting the mounted notebook PC 50 to be removed, and ensuring the implementation of the multi-user mode (the environment wherein the notebook PCs of a plurality of users can be employed). On the other hand, when a kensington lock is inserted into the kensington slot 11, the slider 41 can not move forward and the eject button 13 can not be depressed, so that the hooks 15a, 15b, 15c and 15d can not be released from the engagement holes 55a, 55b, 55c and 55d. As a result, since the removal of the notebook PC 50 is inhibited and the docking station 10 and the notebook PC 50 are securely held together, the physical security inherent to the single user mode is provided.

Although not shown, the slider 41 and the coil spring 45 are symmetrically depicted also on the left side of the docking station 10. The depression of the eject button 13 is also transmitted to the slider 41 on the left side by a transmission mechanism (not shown). It should be noted that since no kensington slots are formed in the left side wall of the docking station 10, liner holes 43 and 44 are not required for the left slider 41.

Referring back to FIG. 3, a stopper plate 46 is a bent member, and shafts 46a and 46b project outward from the ends at the curved portion. These shafts 46a and 46b are supported by a support member (not shown) and rotate in the directions indicated by an arrow A.

Figure 5:
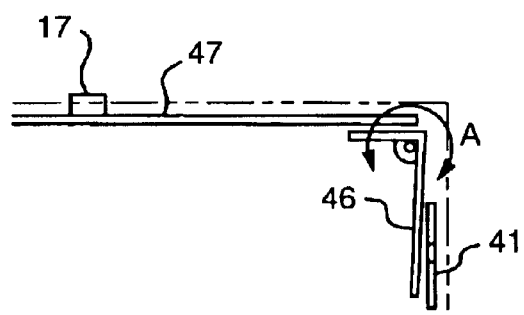
FIG. 5 is another cross-sectional view of the docking station 10.
Figure 6:
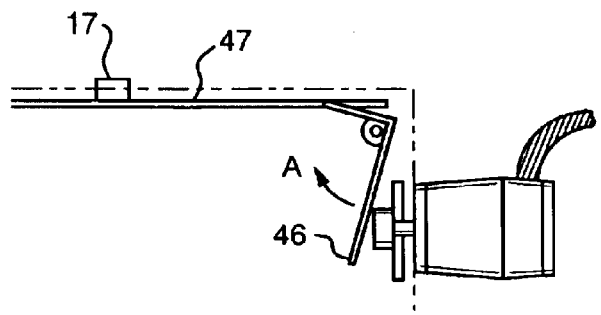
FIG. 6 is the same cross-sectional view as in FIG. 5 for the docking station 10, and more specifically, shows the condition where a stopper plate 46 obstructs the movement of a link 47 when a kensington lock is inserted.

FIGS. 5 and 6 are cross sectional views of another docking station 10. The positional relationship of the stopper plate 46 and the slider 41 should be understood. The stopper plate 46 is located inside the slider 41. When the kensington lock is inserted into either the kensington slot 11 or 12, the head of the T-shaped shaft passes through either linear hole 43 or 44 of the slider 41, and contacts the side portion of the stopper plate 46, which is then rotated clockwise in FIG. 6 (in a direction indicated by an arrow A). As a result, the upper face of the stopper plate 46 is elevated from its initial horizontal position.

Referring again to FIG. 3, a link 47 is a thin plate in an arrowhead shape. Its distal end is supported at the upper wall of the docking, station 10 by a shaft 48 so that it can be rotated in the direction indicated by an arrow C. The previously described slide knob 17 is integrally formed with the upper face of the link 47. The slide knob 17 is exposed from above and extends upward into a rectangular opening that is formed on the upper face of the docking station 10, and can be slid in the longitudinal direction of the opening, i.e., in the direction indicated by an arrow B. When the slide knob 17 is slid to the rear, the link 47 is moved in the direction indicated by the arrow C.

The leg of the link 47 extends over to the right side of the main body of the docking station 10. When a kensington lock has been inserted into either the kensington slot 11 or 12, and the stopper plate 46 is rotated in the direction indicated by the arrow A, the movement of the leg of the link 47 is obstructed by the upper face of the stopper plate 46 (see FIG. 6), and forward movement of the link 47 and the slide knob 17 is inhibited.

The card shutter 23 is formed below the link 47. The card shutter 23 is a U-shaped metal plate, the center portion 23' of which is fixed to the upper wall of the docking station 10. Portions 23a and 23b, which are bent outward from the U-shape, are formed at the ends of the legs of the U-shaped card shutter 23. As is explained while referring to FIG. 2, the bent portions 23a and 23b are used to cover the exchange openings of the PC card slots 21a and 21b.

A pair of bent portions extend outward from the upper edge in the center of the legs of the card shutter 23. Linear cam slits 49a and 49b are formed in the respective bent portions and approach each other as they go to the rear. A pair of small protrusions 47a and 47b, which are formed on the lower face of the link 47, engage the cam slits 49a and 49b. Since the gap between the small protrusions 47a and 47b is constant, the cam slits 49a and 49b are forced to maintain the same gap in accordance with the location to which the slide knob 17, i.e., the link 47, is moved forward and backward.

When the slide knob 17 is moved to the frontmost position, and the small protrusions 47a and 47b, which engage the cam slits 49a and 49b is the greatest, as is shown in FIG. 3, the U-shaped legs of the card shutter 23 are closed. As a result, the bent portions 23a and 23b approach the center, the exchange openings of the PC card slots 21a and 21b are fully opened, and the exchange of PC cards can be performed. In short, the movement of the slide knob 17 to the front permits the deactivation of the physical security for the PC card slots 21a and 21b.

Figure 7:
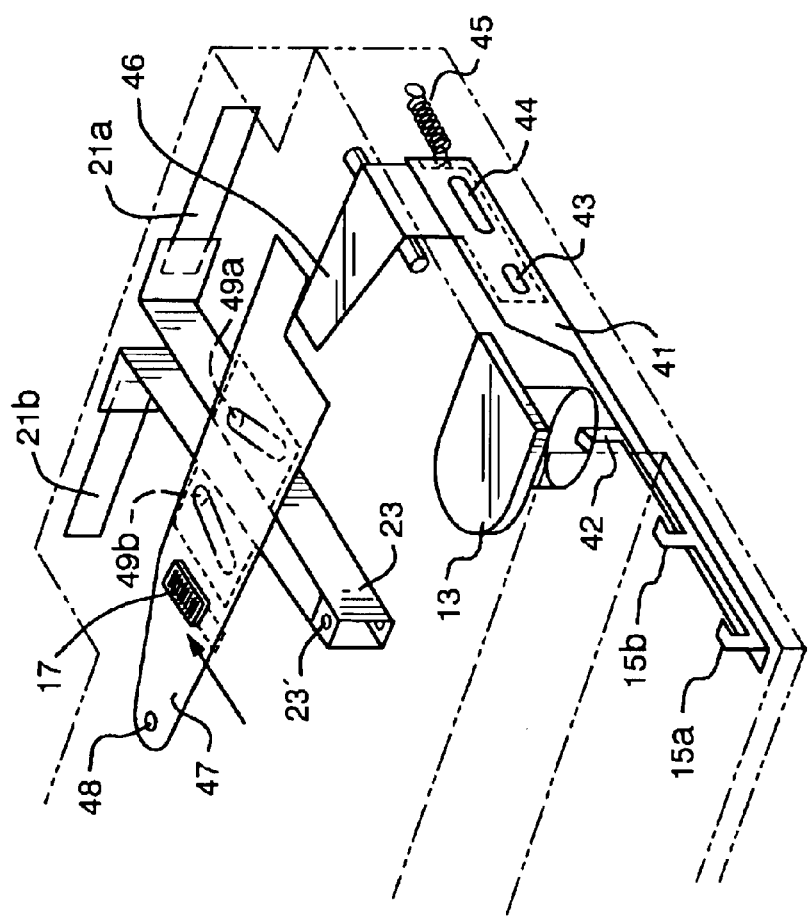
FIG. 7 is a diagram illustrating the internal structure of the docking station 10, with the edges of the case being represented by broken lines, and more specifically shows the movement of card shutters 23a and 23b.

When the slide knob 17 is moved to the rearmost position, and the small protrusions 47a and 47b, which engage the cam slits 49a and 49b, reach the point where the gap between the cam slits 49a and 49b is the smallest, as is shown in FIG. 7, the U-shaped legs of the card shutter 23 are opened. As a result, the bent portions 23a and 23b appear and cover at least part of the exchange openings for the PC card slots 21a and 21b, and the exchange of the PC cards is inhibited. The theft of an inserted PC card in the slot 21a or 21b by extracting it without permission, or the insertion of a PC card by an unauthorized user to access information available in the units 10 and 50, can be prevented. In short, the rearward movement of the slide knob 17 permits the activation of the physical security for the PC card slots 21a and 21b.

From the point of view of the physical security, preferably, the card shutter 23 is made of relatively hard material, such as carbon steel, that is difficult to deform.

The security mechanism in the first embodiment will now be described. As was previously described, the docking station 10 has the two kensington slots 11 and 12.

(1) When the Kensington Lock is Inserted into the Kensington Slot 11

The docking station 10 is secured at a predetermined position in an office, and its physical security is ensured. Since the operation of the eject button 13 is disabled, and the hooks 15a, 15b, 15c and 15d can not be released from the engagement holes 55a, 55b, 55c and 55d, the mounted notebook PC 50 is securely held to the docking station 10. That is, the physical security inherent to the single user mode, during which only one user employs the docking station 10, is provided.

In this condition, the link 47 is temporarily moved to the rear, in accordance with the movement of the slide knob 17, and can not be returned to the front because its movement is obstructed by the stopper plate 46 (see FIG. 6). Thus, the bent portions 23a and 23b of the card shutter 23 are exposed, and the exchange of PC cards is inhibited.

(2) When the Kensington Lock is Inserted into the Kensington Slot 12

The docking station 10 is secured at a predetermined location in an office, and its physical security is ensured. Since the operation of the eject button 13 is enabled, the mounted notebook PC 50 can be removed from the docking station 10 and can be replaced with another notebook PC. In other words, the physical security inherent to the multi-user mode, during which a plurality of PC users share the docking station 10, is provided.

In this condition, the link 47 is temporarily moved to the rear, in accordance with the movement of the slide knob 17, and can not be returned to the front because its movement is obstructed by the stopper plate 46 (see FIG. 6) Thus, the bent portions 23a and 23b of the card shutter 23 are exposed, and the exchange of PC cards is inhibited.

Second Embodiment

The difference between the first and the second embodiments is that the definition of the physical security provided in the multi-user mode is different.

Figure 8:
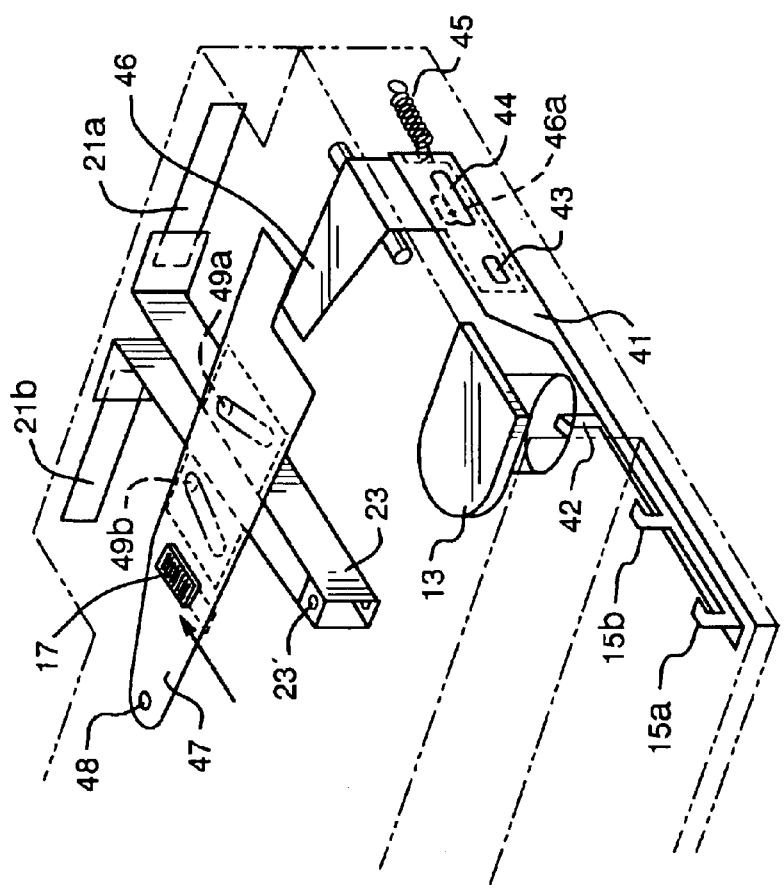
FIG. 8 is a diagram for explaining a second embodiment of the present invention.

FIG. 8 is a diagram illustrating the internal structure of a docking station 10 according to a second embodiment of the present invention. The arrangement in FIG. 8 differs from that in FIG. 7 in that a linear slit 46a is formed in a stopper plate 46. The linear slit 46a is so formed that it has the same shape and size as the first kensington slot 11 at a position corresponding to the second kensington slot 12.

When a kensington lock is inserted into the second kensington slot 12, the head of the T-shaped shaft of the kensington lock passes not only through a second linear slit 44, but also through the linear slit 46a, and a stopper plate 46 is not rotated in the direction indicated by the arrow A in FIG. 6. Therefore, in this condition, the release of the card shutter 23 is permitted.

More specifically, when a kensington lock is inserted into the kensington slot 12, the exchange of notebook PCs and the exchange of PC cards are still enabled though the docking station 10 is secured at a predetermined location in an office. That is, the multi-user mode in the second embodiment permits the shared use of the PC card slots 21 of the docking station 10.

When the kensington lock is inserted into the first kensington slot 11, the same physical security as that provided in the first embodiment is enabled. In other words, the docking station 10, the notebook PC 50, and the PC card slot 21 are locked, and this arrangement is used by a single user.

Third Embodiment

The feature of a third embodiment is not a security mechanism, i.e., a locking mechanism, but an ejecting mechanism for a mounted notebook PC. The locking mechanism in this embodiment is equivalent to that in the first or the second embodiment, so that no detailed explanation of it will be given.

Figure 9:
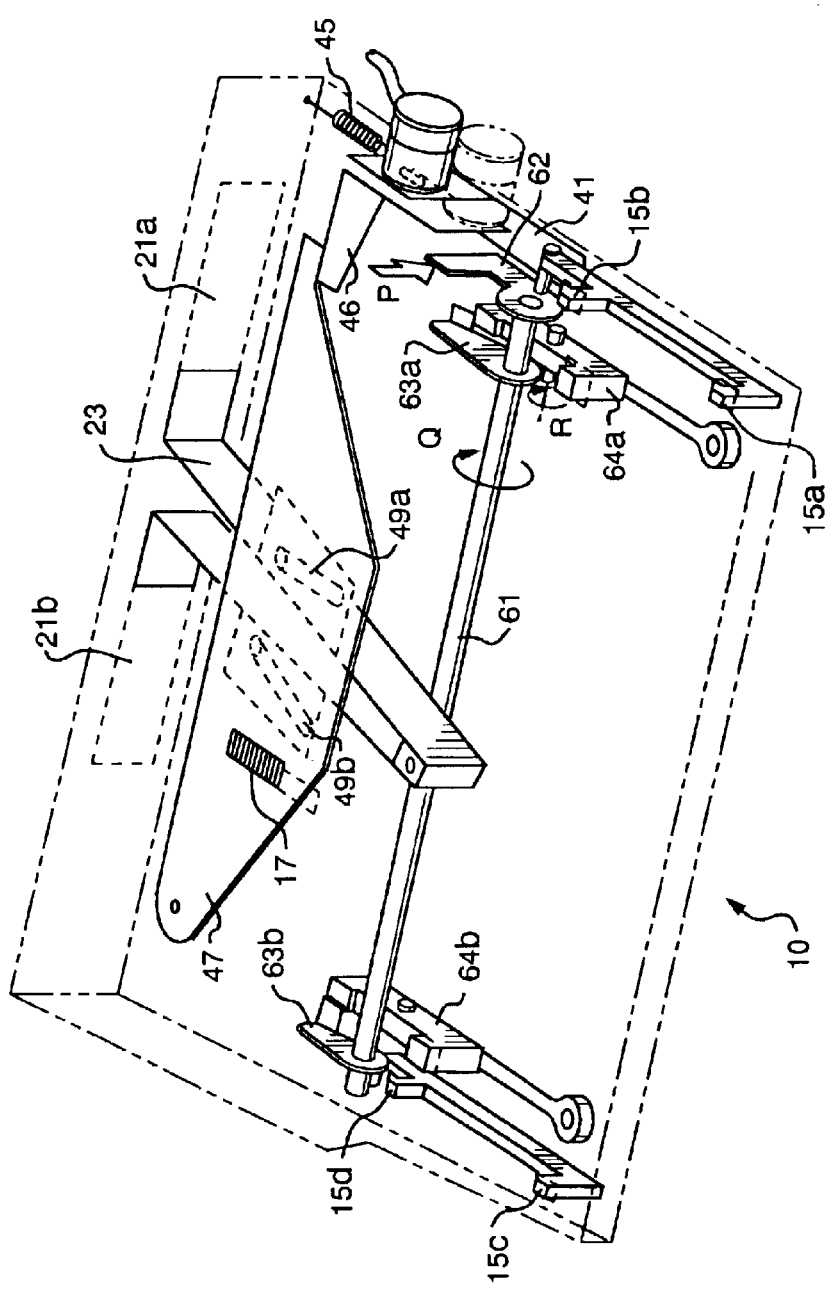
FIG. 9 is a diagram for explaining a third embodiment of the present invention, and more specifically, is a diagram illustrating the internal structure of the docking station 10.

FIG. 9 is a diagram illustrating the internal structure of a docking station 10 according to the third embodiment. The locking mechanism, i.e., the structures of a slider 41, a stopper plate 46, a link 47 and a card shutter 23, and its operational characteristics are the same as those for corresponding components in the first embodiment.

When an eject button 13 (not shown in FIG. 9) provided on the upper face of the docking station 10 is depressed, a force exerted in the direction indicated by an arrow P is applied to a cam 62.

The cam 62 is fixed to one end of a link bar 61 that is supported rotatably. When a kensington lock is not inserted into either slot 11 or 12, depression force P applied to the eject button 13 is changed to a rotational force for rotating the link bar 61 in the direction indicated by an arrow Q. A pair of cams 63a and 63b are integrally formed at either end of the link bar 61. The rotation force Q is transmitted equally to both sides by the link bar 61 and to the cams 63a and 63b.

Each of the cams 63a and 63b has a bent portion at its distal end. When the cams 63a and 63b are driven in the direction indicated by the arrow Q, these bent portions are brought into contact with the ends of ejectors 64a and 64b.

The ejectors 64a and 64b are U-shaped products that have a protrusion on either end. A pair of shafts are projected to either side at the center of each of the ejectors 64a and 64b. These shafts are supported rotatably by a support member (not shown). The protrusions on the ends of the ejectors 64a and 64b contact the bent portions of the cams 63a and 63b, as was previously described. The protrusions on the other ends project upward through openings formed in a mounting portion 14, so that the protrusions can be projected and retracted. When the eject button 13 is depressed, the rotational force exerted in the direction indicated by an arrow R is applied to the ejectors 64a and 64b. As a result, the protrusions on the opposite ends of the ejectors 64a and 64b are projected outward, and push against the bottom face of the mounted notebook PC 50, which is then disengaged from the connectors 16 and ejected.

Figure 10:
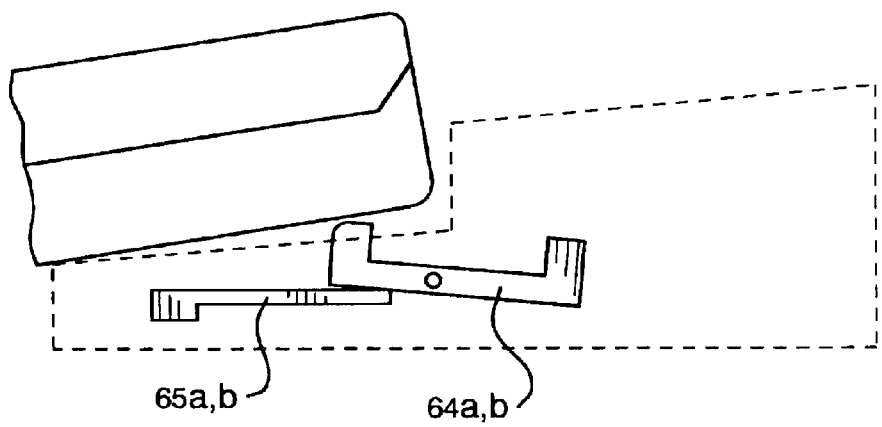
FIG. 10 is a diagram for explaining the third embodiment, and more specifically, it is a side view of the docking station 10.

When the depression of the eject button 13 is halted, the rotational force R received from the cams 63a and 63b is removed. In this embodiment, however, since the lower portion at the other ends of the ejectors 64a and 64b are supported by leaf springs 65a and 65b, the rotational force R for the ejectors 64a and 64b is maintained to a degree. Thus, the ejected notebook PC is prevented from dropping back on to the mounting portion 14 (see FIG. 10).

Figure 11:
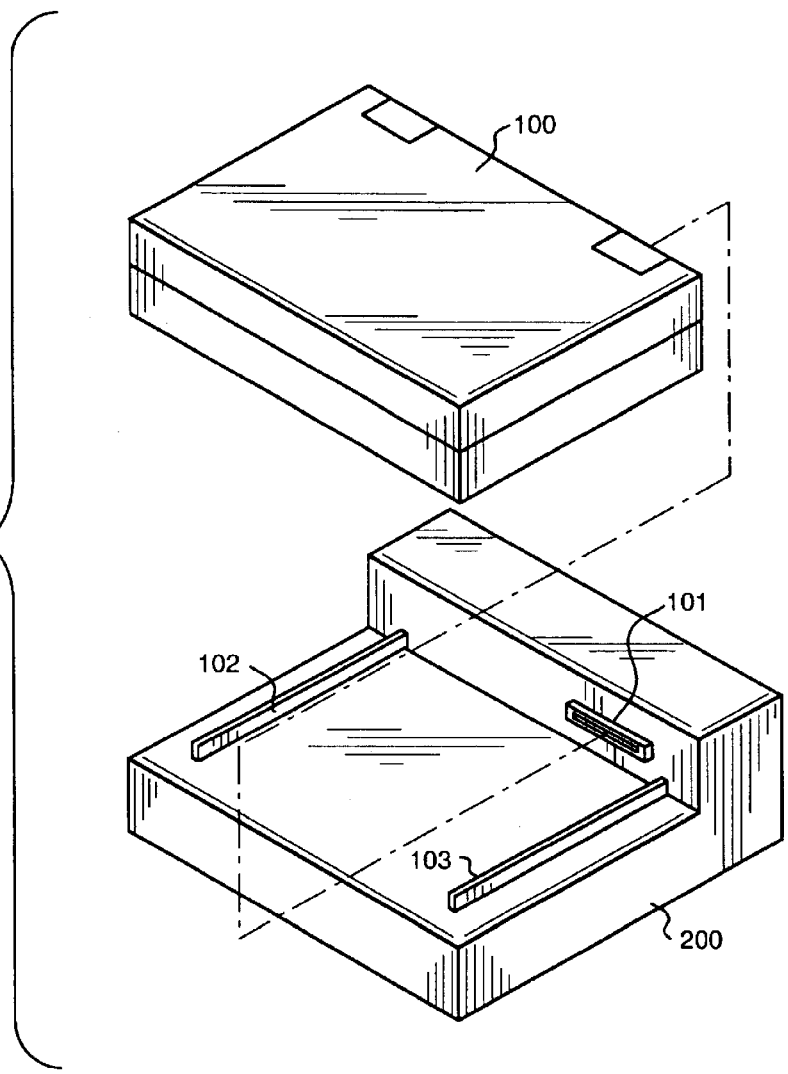
FIG. 11 is a diagram illustrating a specific style of notebook PC 100 and docking station 200.
Figure 12A:
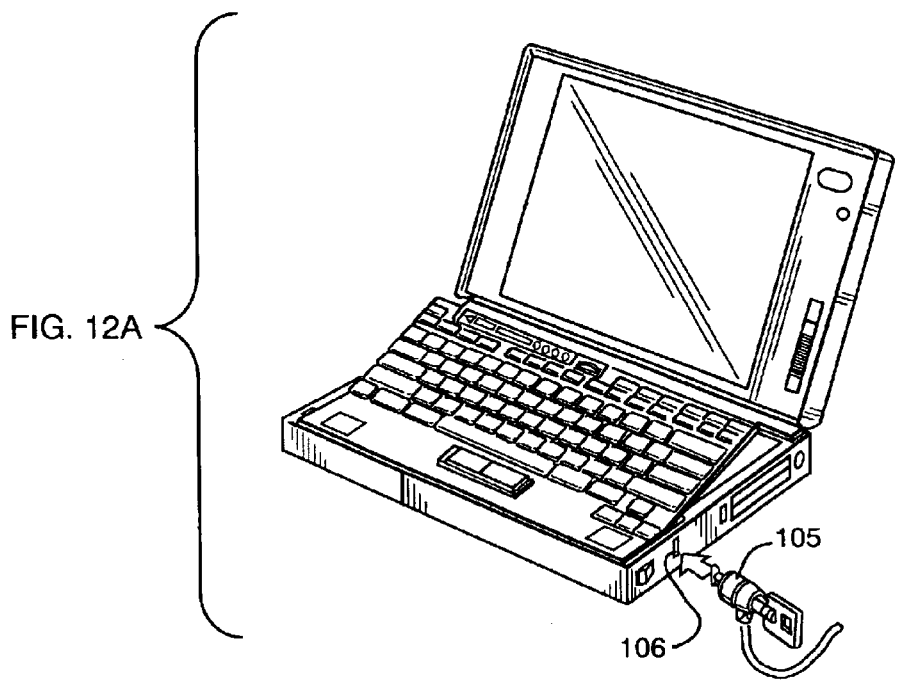
FIG. 12 is a diagram showing the condition where a notebook PC is locked by using a kensington lock.
Figure 12B:
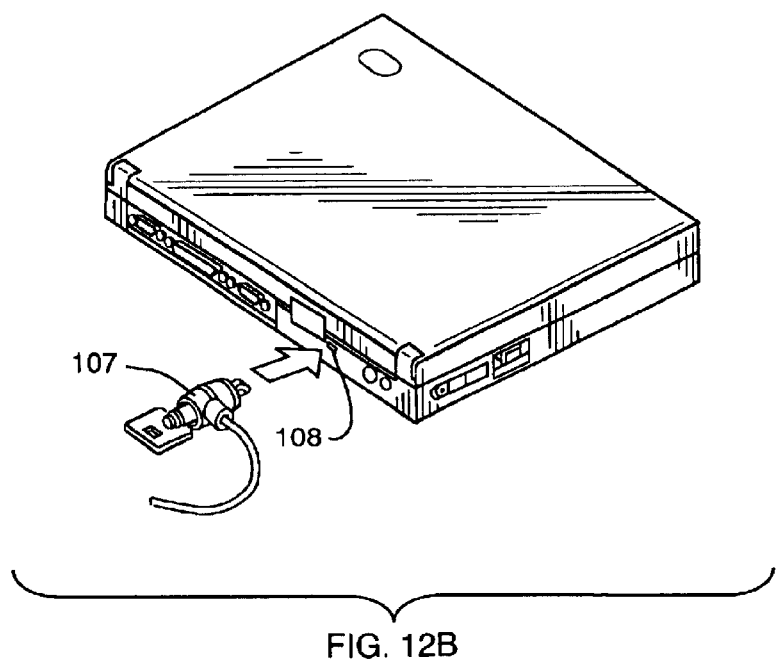
Figure 13A:
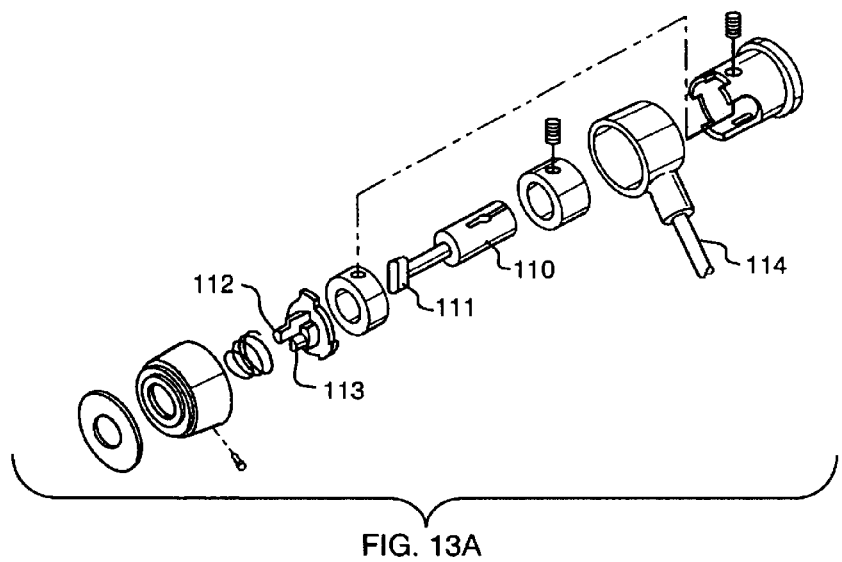
FIG. 13 is a schematic diagram illustrating the assembly of a kensington lock, and more specifically, with FIG. 13(a) being an exploded diagram for the kensington lock, FIG. 13(b) being a diagram for the assembling of a kensington lock, and FIGS. 13(c),(d) and (e) being diagrams for comparing the size and shape of the kensington slot with the those of the head of a T-shaped shaft, contact members, etc.
Figure 13B:
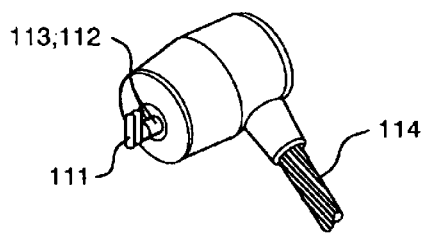
Figure 13C:
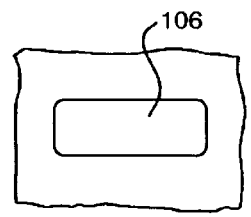
Figure 13D:
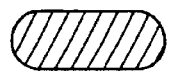
Figure 13E:

As is shown in FIG. 11, when the notebook PC is horizontally attached to or detached from the docking station, the notebook PC, after it is ejected, remains at the position on the mounting surface at which it was ejected. However, if, as in this embodiment, the notebook PC is vertically attached to and detached from the docking station, and the docking connector 16 is provided facing upward, after the notebook PC is ejected its own weight may cause it to drop down and produce an unstable electrical contact condition between the connectors. According to the third embodiment, since the ejectors 64a and 64b are supported by the leaf springs 65a and 65b, and the notebook PC can not easily fall, the docking connectors, once separated from each other will not erroneously be brought into contact. As a result, the chattering that accompanies the contact of the connectors, and the damage to data due to the chattering can be prevented.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

As is described above, according to the present invention, provided is a superior docking unit for a portable computer that can effectively prevent the theft of the main body of the docking unit and a portable computer mounted thereon.

Further, according to the present invention, provided is a superior docking unit for a portable computer that can provide adequate theft prevention environments for a "single user mode" during which the docking unit is used by only one user, and a "multi-user mode" during which the docking unit is shared by a plurality of users.

In addition, according to the present invention, provided is a superior docking unit for a portable computer that can adequately prevent the theft of a portable computer mounted on the docking unit, which is either in a "single user mode" during which the docking unit is used by only one user or a "multi-user mode" during which the docking unit is shared by a plurality of users.

In addition, according to the present invention, provided is a superior docking unit for a portable computer that permits the exchange of a portable computer mounted thereon, while ensuring the security of the docking unit and a PC card.

Still further, according to the present invention, provided is a superior docking unit for a portable computer that can adequately prevent the theft of a PC card in both a "single user mode", during which the docking unit is used by only one user, and a "multi-user mode", during which the docking unit is shared by a plurality of users.

What is claimed is:

1. A docking unit for mounting a portable computer comprising:
    (a) a main body;
    (b) a mounting portion for mounting a portable computer;
    (c) a first kensington slot provided on the outer wall of said main body;
    (d) a second kensington slot provided on the outer wall of said main body;
    (e) engaging means for engaging with the portable computer mounted on said mounting portion;
    (f) engaging release means for releasing said portable computer from an engaging with said engaging means; and
    (g) notification means for inhibiting release of an engaging by notifying said engaging release means that a kensington lock has been inserted into said first kensington slot, and for not notifying said engaging release means that said kensington lock has been inserted into said second kensington slot.

2. A docking unit for mounting a portable computer comprising:
    (a) a main body;
    (b) a mounting portion for mounting a portable computer;
    (c) a PC card slot provided in said main body for inserting a PC card;
    (d) restricting means formed at the ejection opening of said PC card slot to restrict the exchange of a PC card;
    (e) a first kensington slot provided on the outer wall of said main body;
    (f) a second kensington slot provided on the outer wall of said main body;
    (g) restricting release means for releasing a restriction of the exchange of a PC card imposed by said restricting means; and
    (h) notification means for notifying said restricting release means when a kensington lock has been inserted into one of said first and said second kensington slots, in order to maintain said restriction condition of the exchange of a PC card.

3. A docking unit for mounting a portable computer comprising:
    (a) a main body;
    (b) a mounting portion for mounting a portable computer;
    (c) a PC card slot provided in said main body for inserting a PC card;
    (d) restricting means formed at the ejection opening of said PC card slot to restrict the exchange of a PC card;
    (e) a first kensington slot provided on the outer wall of said main body;
    (f) a second kensington slot provided on the outer wall of said main body;
    (g) engaging means for engaging with the portable computer mounted on said mounting portion;
    (h) engaging release means for releasing said portable computer from an engaging with said engaging means;
    (i) restricting release means for releasing a restriction of the exchange of a PC card imposed by said restricting means;
    (j) first notification means for inhibiting release of an engagement by notifying said engaging release means that a kensington lock has been inserted into said first kensington slot, and for not notifying said engaging release means that said kensington lock has been inserted into said second kensington slot; and (k) second notification means for maintaining restriction of the exchange of a PC card by notifying said restricting release means that said kensington lock has been inserted into one of said first and said second kensington slots.

4. A docking unit for mounting a portable computer comprising:

(a) a main body;

(b) a mounting portion for mounting a portable computer;

(c) a PC card slot provided in said main body for inserting a PC card;

(d) restricting means formed at said ejection opening of said PC card slot to restrict the exchange of a PC card;

(e) a first kensington slot provided on the outer wall of said main body;

(f) a second kensington slot provided on the outer wall of said main body;

(g) restricting release means for releasing a restriction of the exchange of a PC card imposed by said restricting means; and (h) notification means for inhibiting release of a restriction by notifying said restricting release means that a kensington lock has been inserted into said first kensington slot, and for not notifying said restricting release means that said kensington lock has been inserted into said second kensington slot.

5. A docking unit for mounting a portable computer comprising:

(a) a main body;

(b) a mounting portion for mounting a portable computer;

(c) a PC card slot provided in said main body for inserting a PC card;

(d) restricting means formed at said ejection opening of said PC card slot to restrict the exchange of a PC card;

(e) a first kensington slot provided on the outer wall of said main body;

(f) a second kensington slot provided on the outer wall of said main body;

(g) engaging means for engaging with the portable computer mounted on said mounting portion;

(h) engaging release means for releasing said portable computer from an engaging with said engaging means;

(i) restricting release means for releasing a restriction of the exchange of a PC card imposed by said restricting means;

(j) first notification means for inhibiting release of an engagement by notifying said engaging release means that a kensington lock has been inserted into said first kensington slot, and for not notifying said engaging release means that said kensington lock has been inserted into said second kensington slot; and (k) second notification means for inhibiting release of an engagement by notifying said engaging release means that a kensington lock has been inserted into said first kensington slot, and for not notifying said engaging release means that said kensington lock has been inserted into said second kensington slot.

6. A docking unit for mounting a portable computer comprising:

(a) a main body;

(b) a mounting portion, for mounting a portable computer thereon;

(c) a docking connector provided at an elevated location on said mounting portion for an electrical connection with said portable computer on said mounting portion;

(d) engaging means for engaging with said portable computer mounted on said mounting portion;

(e) ejecting means, provided on said mounting portion, to be vertically projected and retracted, such that said ejecting means is vertically projected to raise said portable computer mounted on said mounting portion, for removal from said docking connector;

(f) ejecting instruction means used by a user to instruct ejection of said mounted portable computer;

(g) notification means for, in response to a user's operation of said ejecting instruction means, releasing said engaging means and extending said ejecting means vertically upward; and (h) retracting prevention means for preventing said ejecting means when elevated from descending and being retracted into said mounting portion.

7. The docking unit for a portable computer according to claim 6, wherein said retracting prevention means includes means for preventing retraction against a weight of said portable computer.

* * * * *